United States Patent
Fujii

(10) Patent No.: US 11,285,806 B2
(45) Date of Patent: Mar. 29, 2022

(54) DRIVING FORCE DISTRIBUTION DEVICE

(71) Applicant: JTEKT CORPORATION, Osaka (JP)

(72) Inventor: Noriyuki Fujii, Hekinan (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/010,920

(22) Filed: Sep. 3, 2020

(65) Prior Publication Data
US 2021/0070169 A1    Mar. 11, 2021

(30) Foreign Application Priority Data

Sep. 10, 2019  (JP) .............................. JP2019-164381

(51) Int. Cl.
*B60K 17/02* (2006.01)
*F16D 13/70* (2006.01)
*F16D 21/00* (2006.01)
*F16D 13/52* (2006.01)

(52) U.S. Cl.
CPC .............. *B60K 17/02* (2013.01); *F16D 13/52* (2013.01); *F16D 13/70* (2013.01); *F16D 21/00* (2013.01)

(58) Field of Classification Search
CPC ..... F16D 2021/0661; F16D 2021/0607; F16D 13/52; F16D 21/00
See application file for complete search history.

(56) References Cited

U.S. PATENT DOCUMENTS

| 2013/0199883 A1 | 8/2013 | Akiba et al. |
| 2015/0330461 A1* | 11/2015 | Datema .................. F16D 13/70 192/48.601 |
| 2016/0084322 A1* | 3/2016 | Arhab ................. F16D 25/0638 192/70.12 |

FOREIGN PATENT DOCUMENTS

WO    WO 2011/089825 A1    7/2011

* cited by examiner

*Primary Examiner* — Stacey A Fluhart
(74) *Attorney, Agent, or Firm* — Oblon, McClelland, Maier & Neustadt, L.L.P.

(57) ABSTRACT

A driving force distribution device includes a first output rotational member and a second output rotational member, an input rotational member, a first multiple disc clutch, a second multiple disc clutch, a pressure receiving member, a first pressing mechanism and a second pressing mechanism. The pressure receiving member includes an annular base portion and a plurality of projecting pieces, the projecting pieces include a plurality of first projecting pieces and a plurality of second projecting pieces. The first projecting pieces each have a first pressure receiving surface, the second projecting pieces each have a second pressure receiving surface.

7 Claims, 7 Drawing Sheets

(FIRST EMBODIMENT)

(FIRST EMBODIMENT)

(FIRST EMBODIMENT)

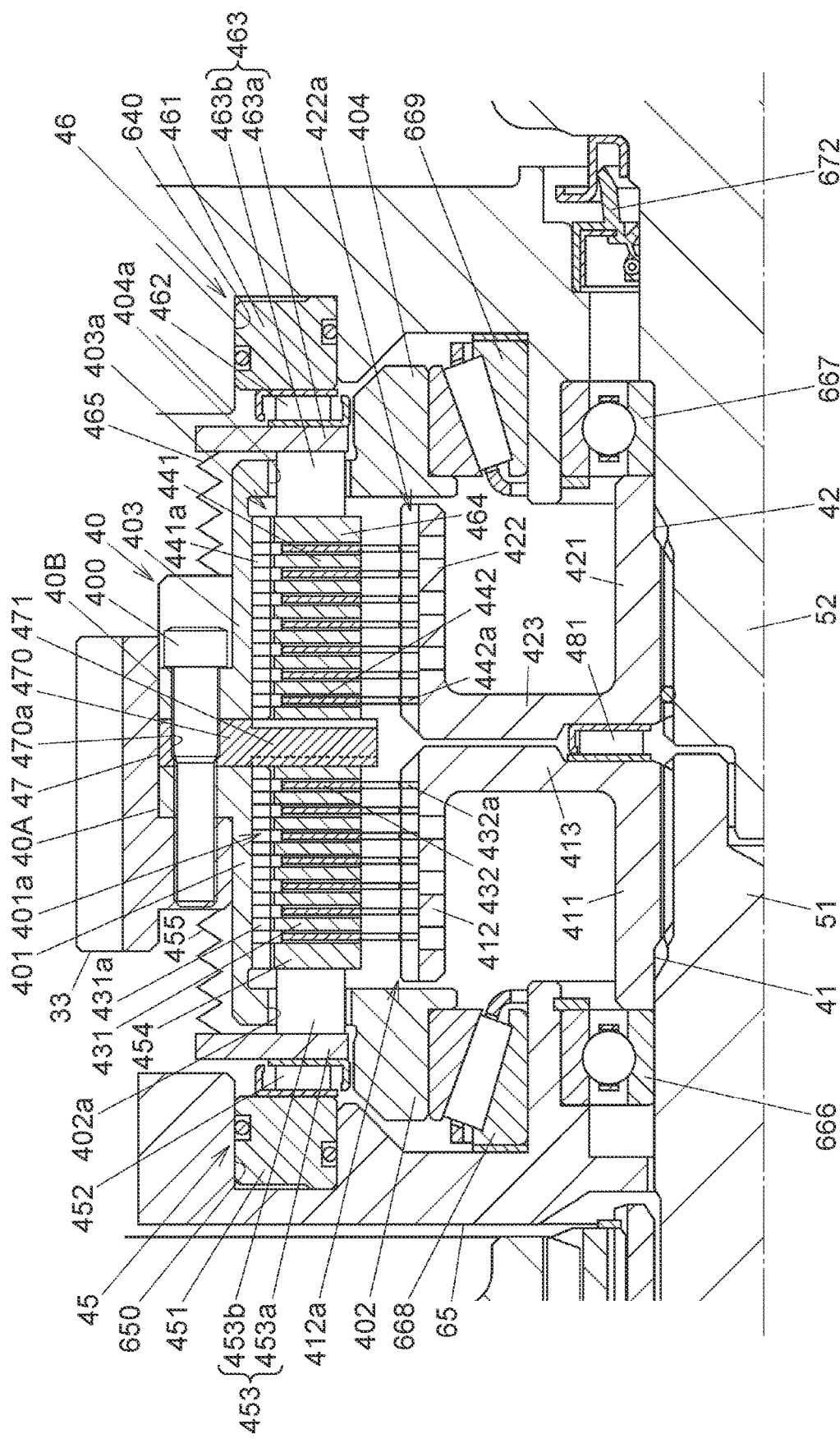
FIG. 3 (FIRST EMBODIMENT)

(FIRST EMBODIMENT)

(FIRST EMBODIMENT)

(FIRST EMBODIMENT)

(MODIFICATION)

(MODIFICATION)

(MODIFICATION)

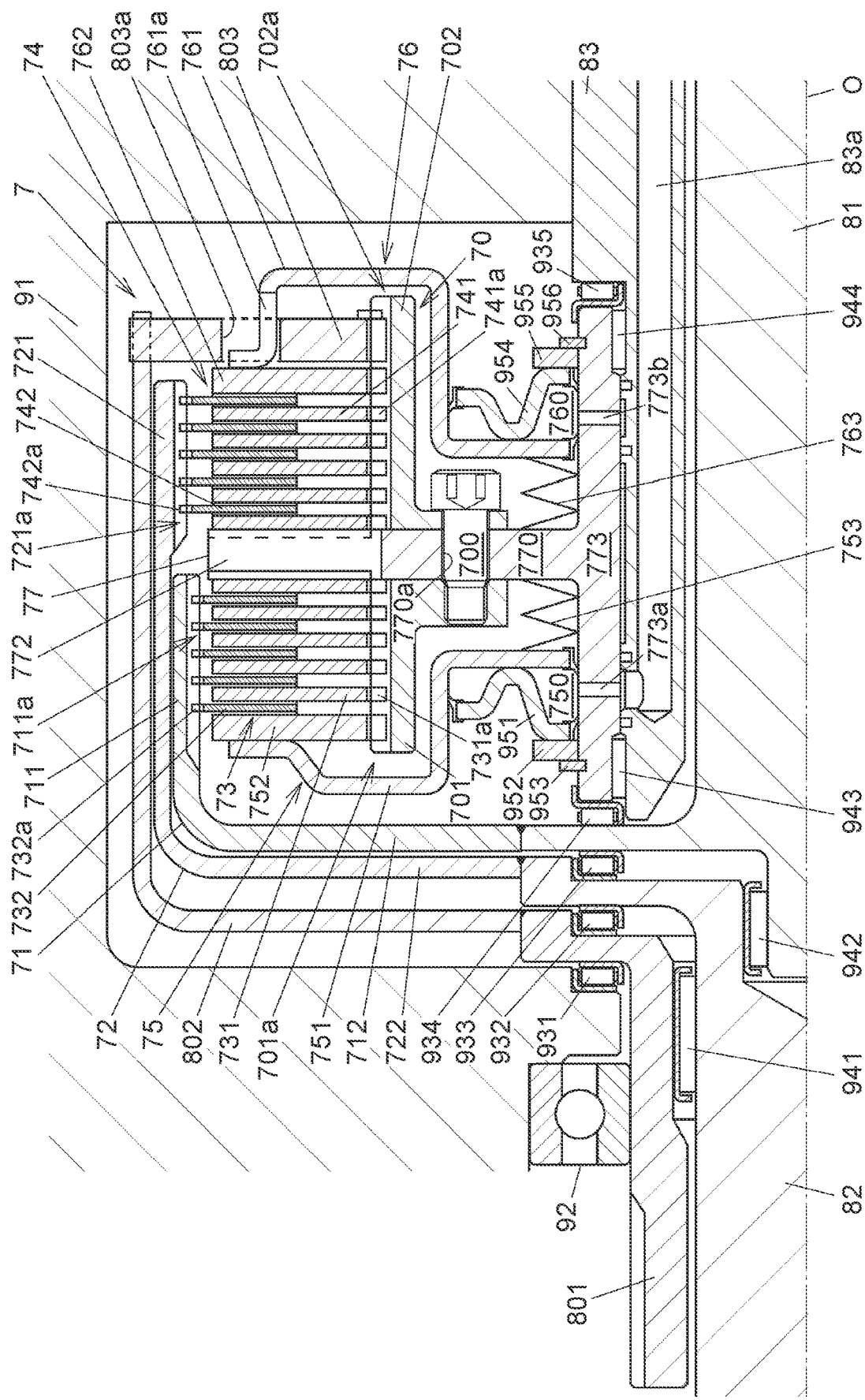

(SECOND EMBODIMENT)

(SECOND EMBODIMENT)

DRIVING FORCE DISTRIBUTION DEVICE

CROSS-REFERENCE TO RELATED APPLICATION

This application claims priority to Japanese Patent Application No. 2019-164381 filed on Sep. 10, 2019, incorporated herein by reference in its entirety.

BACKGROUND

1. Technical Field

The present disclosure relates to a driving force distribution device configured to output an input driving force by distributing the driving force into first and second output rotational members.

2. Description of Related Art

In the related art, a driving force distribution device configured to output an input driving force by distributing the driving force into first and second output rotational members is used to distribute the driving force into a pair of right and left auxiliary driving wheels in a four-wheel drive vehicle, for example (see WO 2011/089825, for example).

The driving force distribution device (a power transmission device) described in WO 2011/089825 includes: right and left output shafts configured to output a driving force to right and left rear wheels; a clutch outer portion connected to an input shaft to which the driving force is input; right and left clutch inner portions connected to the right and left output shafts, respectively; right and left frictional engagement members each placed between the clutch outer portion and a corresponding one of the right and left clutch inners; and right and left clutch pistons configured to presses the right and left frictional engagement members in the axial direction.

The clutch outer portion includes: a boss portion positioned between the right and left clutch inner portion s in the axial direction via a plurality of bearings; right and left disc portions branching off from the boss portion so that the right and left disc portions support respective pressing forces of the right and left clutch pistons, the pressing forces being transmitted via the right and left frictional engagement members; and right and left drum portions extending in the axial direction from the right and left disc portions so that the right and left drum portions guide respective outer peripheral portions of the right and left frictional engagement members. Respective inner peripheries of the right and left disc portions are welded to an outer periphery of the boss portion, and an axial gap is formed between the right and left disc portions. This gap restrains the pressing force of the left clutch piston from being transmitted to the right frictional engagement member and the pressing force of the right clutch piston from being transmitted to the left frictional engagement member, thereby making it possible to prevent respective operations of the right and left clutches from interfering with each other.

SUMMARY

In the configuration of the driving force distribution device described in WO 2011/089825, the gap is formed between the right and left disc portions. Because of this, a distance between the right and left frictional engagement members becomes wide, so that the device upsizes. Particularly, in a case of a driving force distribution device to be provided in a vehicle, due to an increase in weight along with the upsizing, fuel-efficiency performance decreases. Further, a large mounting space is required, so that the mountability to a vehicle also decreases.

The present disclosure provides a driving force distribution device which is restrained from being upsized and which restrains interference between a pressing force of a multiple disc clutch configured to transmit a driving force from an input rotational member to a first output rotational member and a pressing force of a multiple disc clutch configured to transmit a driving force from the input rotational member to a second output rotational member.

A driving force distribution device according to one aspect of the present disclosure includes a first output rotational member and a second output rotational member, an input rotational member, a first multiple disc clutch, a second multiple disc clutch, a pressure receiving member, a first pressing mechanism, and a second pressing mechanism. The first output rotational member and the second output rotational member are placed to rotate relative to each other on the same axis. The input rotational member is placed to rotate relative to the first output rotational member and the second output rotational member on the same axis. The first multiple disc clutch is placed between the input rotational member and the first output rotational member and includes a plurality of clutch plates. The second multiple disc clutch is placed between the input rotational member and the second output rotational member and includes a plurality of clutch plates. The pressure receiving member is placed between the first multiple disc clutch and the second multiple disc clutch. The first pressing mechanism is configured to press the first multiple disc clutch toward the pressure receiving member. The second pressing mechanism is configured to press the second multiple disc clutch toward the pressure receiving member. The pressure receiving member includes an annular base portion fixed to the input rotational member, and a plurality of projecting pieces projecting radially from the base portion. The projecting pieces include a plurality of first projecting pieces and a plurality of second projecting pieces. The first projecting pieces each have a first pressure receiving surface configured to receive a pressing force of the first pressing mechanism via the first multiple disc clutch. The second projecting pieces each have a second pressure receiving surface configured to receive a pressing force of the second pressing mechanism via the second multiple disc clutch. A first back face as a back face of the first pressure receiving surface is at least partially placed closer to the first multiple disc clutch side than the second pressure receiving surface. A second back face as a back face of the second pressure receiving surface is at least partially placed closer to the second multiple disc clutch side than the first pressure receiving surface.

With the above configuration, it is possible to restrain such a situation that a pressing force of a multiple disc clutch configured to transmit a driving force from the input rotational member to the first output rotational member interferes with a pressing force of a multiple disc clutch configured to transmit a driving force from the input rotational member to the second output rotational member, and it is possible to restrain upsizing of the device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an enlarged view illustrating a part of FIG. 2 in an enlarged manner;

FIG. 6 is a sectional view illustrating an exemplary configuration of a driving force distribution device according to a second embodiment;

DETAILED DESCRIPTION OF EMBODIMENTS

First Embodiment

A first embodiment of the present disclosure will be described with reference to FIGS. 1 to 4C. Note that the embodiment described below indicates a concrete example on performing the present disclosure. There are some parts that technically show various technical matters specifically, but a technical scope of the present disclosure is not limited to such a concrete example.

Figure 1:
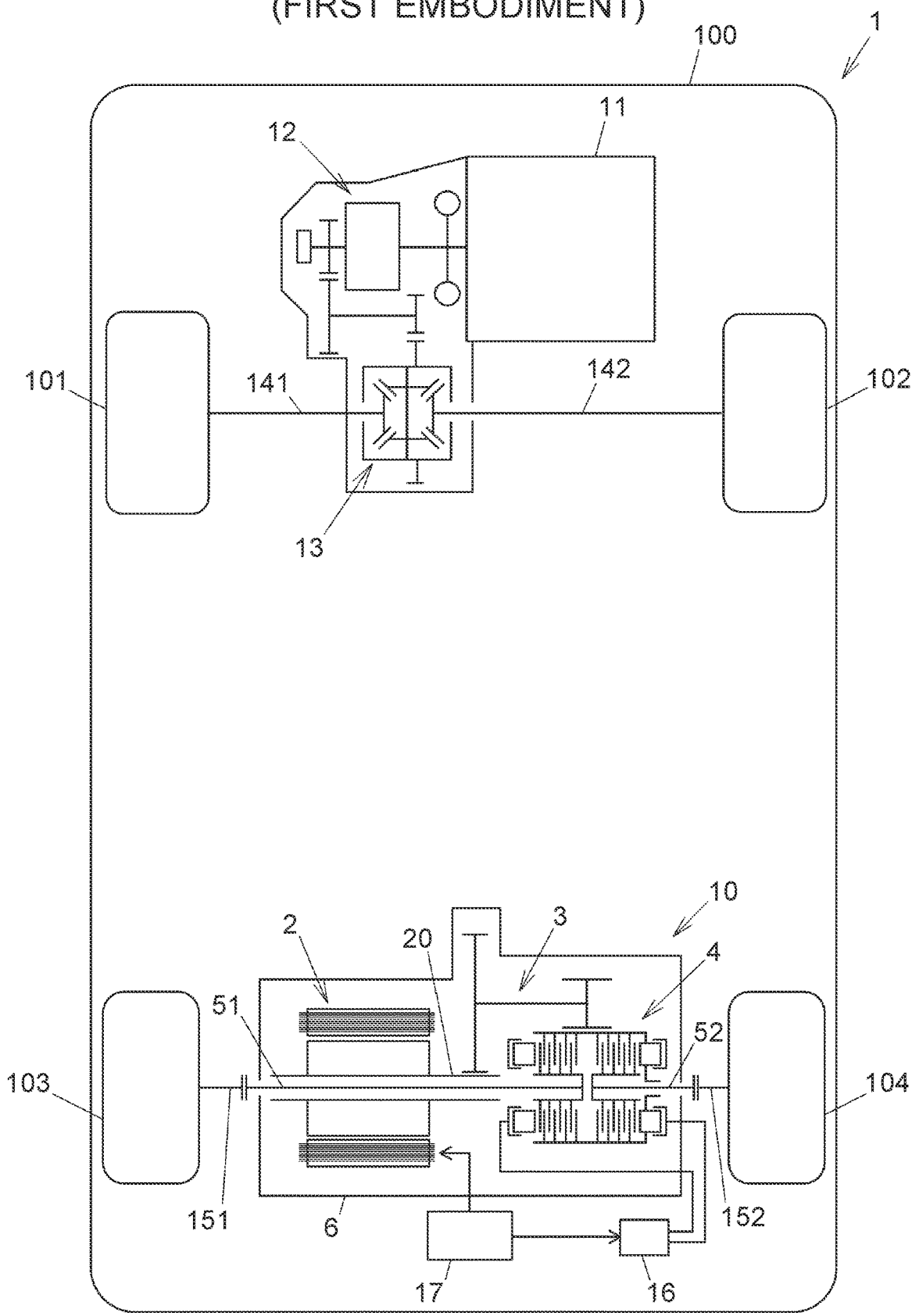
FIG. 1 is a schematic view illustrating a schematic exemplary configuration of a four-wheel drive vehicle equipped with a driving force distribution device according to a first embodiment of the present disclosure.

FIG. 1 is a schematic view illustrating a schematic exemplary configuration of a four-wheel drive vehicle equipped with a driving force distribution device according to the first embodiment of the present disclosure. The four-wheel drive vehicle 1 is configured such that right and left front wheels 101, 102 as main driving wheels are driven by a driving force of an engine 11 as a main drive source, and right and left rear wheels 103, 104 as auxiliary driving wheels are driven by an auxiliary driving device 10 including an electric motor 2 as an auxiliary drive source.

The driving force of the engine 11 is transmitted from a transmission 12 to a differential device 13 and is distributed into the right and left front wheels 101, 102 from the differential device 13 via right and left drive shafts 141, 142. Note that, as the main drive source, a high-output electric motor may be used, and a so-called hybrid electric motor constituted by combining an engine and a high-output electric motor may be used.

A driving force of the electric motor 2 of the auxiliary driving device 10 is transmitted to the right and left rear wheels 103, 104 via right and left drive shafts 151, 152. The auxiliary driving device 10 includes the electric motor 2, a deceleration mechanism 3 configured to decelerate the rotation of an output shaft 20 of the electric motor 2, a driving force distribution device 4 configured to output a driving force input from the deceleration mechanism 3 by distributing the driving force into the right and left drive shafts 151, 152, first and second output shafts 51, 52 connected to the right and left drive shafts 151, 152, respectively, and a housing 6 in which these members are accommodated. The housing 6 is fixed to a vehicle body 100. In the present embodiment, the driving force distribution device 4 operates by a hydraulic fluid supplied from a hydraulic unit 16. The hydraulic unit 16 and the electric motor 2 are controlled by a control device 17.

Figure 2:
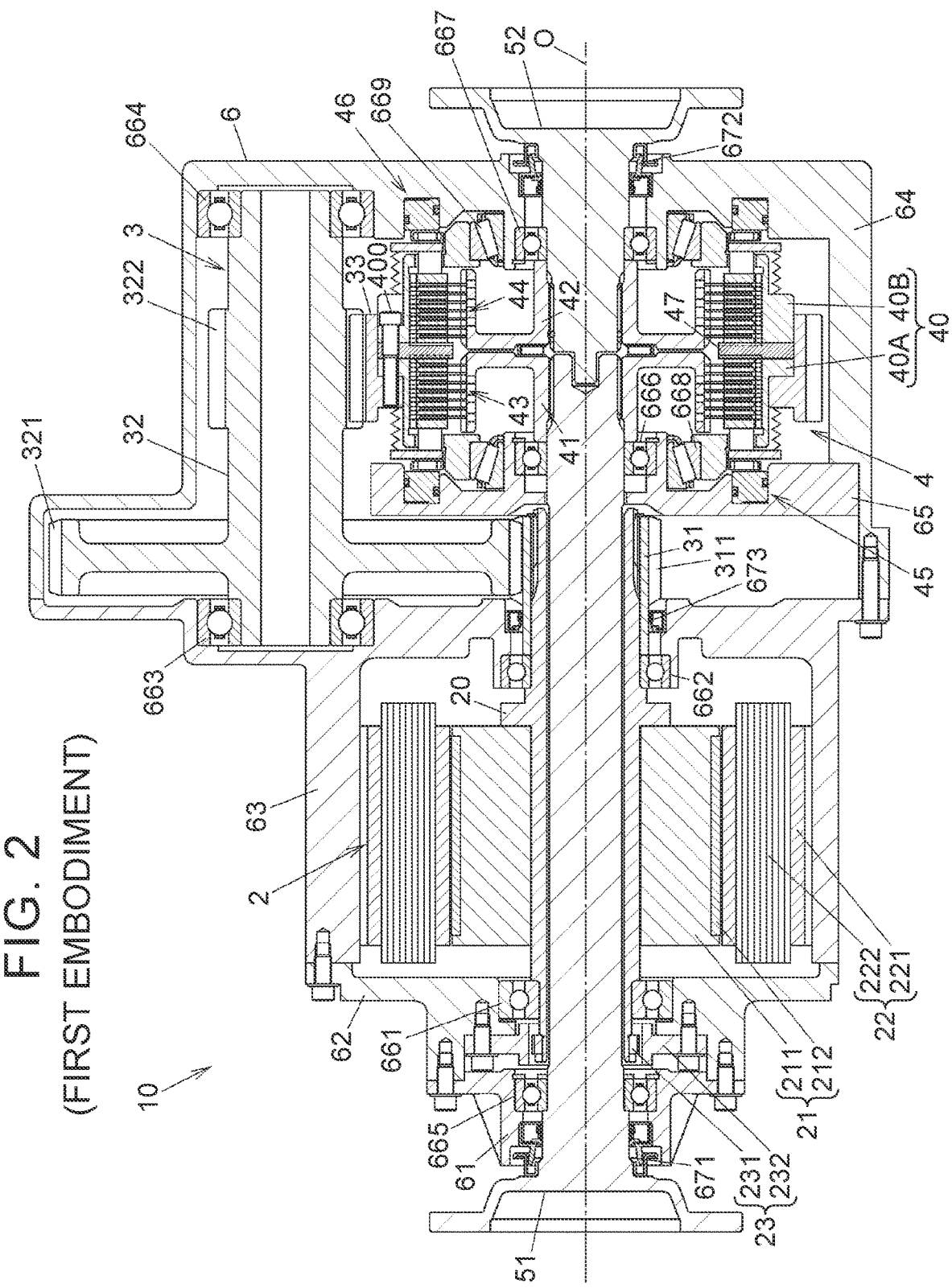
FIG. 2 is a sectional view illustrating an exemplary configuration of an auxiliary driving device.

FIG. 2 is a sectional view illustrating an exemplary configuration of the auxiliary driving device 10. FIG. 3 is an enlarged view illustrating a part of FIG. 2 in an enlarged manner. In FIG. 2, the left side in the figure corresponds to the left side of the four-wheel drive vehicle 1 in the vehicle right-left direction, and the right side in the figure corresponds to the right side of the four-wheel drive vehicle 1 in the vehicle right-left direction. The housing 6 includes first to fifth housing members 61 to 65, and the housing members 61 to 65 are fixed to each other by a plurality of bolts.

The electric motor 2 is accommodated in the third housing member 63, and a left opening of the third housing member 63 in the vehicle right-left direction is closed by the first and second housing members 61, 62. The deceleration mechanism 3 and the driving force distribution device 4 are accommodated in the fourth housing member 64, and the fifth housing member 65 is fixed inside the fourth housing member 64. The fifth housing member 65 sections an accommodation space for a large-diameter gear wheel portion 321 of a reduction gear 32 (described later) from an accommodation space for the driving force distribution device 4.

The electric motor 2 includes the output shaft 20 formed in a hollow tubular shape, a rotor 21 configured to rotate together with the output shaft 20 in an integrated manner, a stator 22 placed on an outer periphery of the rotor 21, and a rotation sensor 23 configured to detect the rotation of the output shaft 20. The rotor 21 includes a rotor core 211 and a plurality of permanent magnets 212 fixed to the rotor core 211. The stator 22 includes a stator core 221 and coils 222 of a plurality of phases, the coils 222 being wound on the stator core 221. A first output shaft 51 is passed through the inside of the output shaft 20.

The stator core 221 is fixed to the third housing member 63. A motor current is supplied to the coils 222 of the phases from the control device 17. The rotation sensor 23 is constituted by a resolver rotor 231 fixed to the output shaft 20 and a resolver sensor 232 fixed to the second housing member 62. A detection signal of the resolver sensor 232 is sent to the control device 17. The output shaft 20 is supported by a bearing 661 and a bearing 662 so that the output shaft 20 rotates. The bearing 661 is placed between the output shaft 20 and the second housing member 62, and the bearing 662 is placed between the output shaft 20 and the third housing member 63.

The deceleration mechanism 3 includes a tubular pinion gear 31 outwardly engaged with an end portion of the output shaft 20 of the electric motor 2, the reduction gear 32 having the large-diameter gear wheel portion 321 and a small-diameter gear wheel portion 322, and a ring gear 33 meshing with the small-diameter gear wheel portion 322. The pinion gear 31 is fitted to the output shaft 20 in a spline manner so as to rotate together with the output shaft 20 in an integrated manner. Further, a gear portion 311 formed on an outer periphery of the pinion gear 31 meshes with the large-diameter gear wheel portion 321 of the reduction gear 32.

The small-diameter gear wheel portion 322 of the reduction gear 32 is formed in a hollow shaft shape and is supported by a bearing 663 and a bearing 664 so that the small-diameter gear wheel portion 322 rotates. The bearing 663 is placed between the small-diameter gear wheel portion 322 and the third housing member 63, and the bearing 664 is placed between the small-diameter gear wheel portion 322 and the fourth housing member 64. The driving force of the electric motor 2 is input into an input rotational member 40 of the driving force distribution device 4 from the ring gear 33 via the pinion gear 31 and the reduction gear 32.

The driving force distribution device 4 transmits the driving force input from the ring gear 33 to the first and second output shafts 51, 52. The first output shaft 51 is supported by a bearing 665 and a bearing 666 so that the first output shaft 51 rotates. The bearing 665 is placed between the first output shaft 51 and the first housing member 61, and the bearing 666 is placed between the first output shaft 51 and the fifth housing member 65. A sealing member 671 for preventing invasion of foreign matter is placed between the first housing member 61 and the first output shaft 51. The second output shaft 52 is supported by a bearing 667 so that the second output shaft 52 rotates. The bearing 667 is placed between the second output shaft 52 and the fourth housing member 64.

Lubricant is filled in the fourth housing member 64, and leakage of the lubricant to outside the housing 6 is restrained by a sealing member 672 placed between the fourth housing member 64 and the second output shaft 52. Further, leakage of the lubricant to the electric motor 2 side is restrained by a sealing member 673 placed between the third housing member 63 and the pinion gear 31. The lubricant lubricates sliding of each part of the driving force distribution device 4.

The driving force distribution device 4 includes: first and second output rotational members 41, 42 placed to rotate relative to each other on the same axis; the input rotational member 40 placed to rotate relative to the first and second output rotational members 41, 42 on the same axis; a first multiple disc clutch 43 placed between the input rotational member 40 and the first output rotational member 41; a second multiple disc clutch 44 placed between the input rotational member 40 and the second output rotational member 42; a first pressing mechanism 45 configured to press the first multiple disc clutch 43; a second pressing mechanism 46 configured to press the second multiple disc clutch 44; and a pressure receiving member 47 (a center plate) placed between the first multiple disc clutch 43 and the second multiple disc clutch 44. The first and second output rotational members 41, 42 are arranged in the axial direction along a rotation axis O of the first and second output shafts 51, 52.

The input rotational member 40 includes a first clutch drum 40A placed on an outer periphery of the first output rotational member 41, and a second clutch drum 40B placed on an outer periphery of the second output rotational member 42. The first clutch drum 40A and the second clutch drum 40B are connected together with the ring gear 33 and the center plate 47 by a plurality of bolts 400 in a relatively non-rotatable manner. In FIGS. 2 and 3, among the bolts 400, one bolt 400 is illustrated.

The first output rotational member 41 integrally includes: a small-diameter cylindrical portion 411 to which the first output shaft 51 is connected by spline-fitting in a relatively non-rotatable manner; a large-diameter cylindrical portion 412 provided on an outer periphery of the small-diameter cylindrical portion 411; and an annular connecting wall portion 413 configured to connect the small-diameter cylindrical portion 411 to the large-diameter cylindrical portion 412. Similarly, the second output rotational member 42 integrally includes: a small-diameter cylindrical portion 421 to which the second output shaft 52 is connected by spline-fitting in a relatively non-rotatable manner; a large-diameter cylindrical portion 422 provided on an outer periphery of the small-diameter cylindrical portion 421; and an annular connecting wall portion 423 configured to connect the small-diameter cylindrical portion 421 to the large-diameter cylindrical portion 422. A thrust roller bearing 481 is placed between the connecting wall portion 413 of the first output rotational member 41 and the connecting wall portion 423 of the second output rotational member 42.

The first multiple disc clutch 43 is placed between the first clutch drum 40A and the large-diameter cylindrical portion 412 of the first output rotational member 41 so that the first multiple disc clutch 43 transmits a driving force from the first clutch drum 40A to the first output rotational member 41. The second multiple disc clutch 44 is placed between the second clutch drum 40B and the large-diameter cylindrical portion 422 of the second output rotational member 42 so that the second multiple disc clutch 44 transmits a driving force from the second clutch drum 40B to the second output rotational member 42.

The first multiple disc clutch 43 includes: a plurality of first input clutch plates 431 configured to rotate together with the input rotational member 40; and a plurality of first output clutch plates 432 configured to rotate together with the first output rotational member 41. The first output clutch plate 432 includes a plurality of projections 432a provided in an end portion, on the inside-diameter side, of the first output clutch plate 432. The projections 432a are engaged with a spline portion 412a formed on an outer peripheral surface of the large-diameter cylindrical portion 412 of the first output rotational member 41 in an axially movable manner and in a relatively non-rotatable manner.

The first clutch drum 40A integrally includes a cylindrical portion 401 formed in a cylindrical shape, and a side wall portion 402 extending radially inwardly from a first axial end portion of the cylindrical portion 401. A spline engageable portion 401a is formed on an inner peripheral surface of the cylindrical portion 401. The first input clutch plates 431 are engaged with the spline engageable portion 401a in an axially movable manner and in a relatively non-rotatable manner. A plurality of projections 431a engaged with the spline engageable portion 401a is provided in an end portion, on the outside-diameter side, of the first input clutch plate 431. The side wall portion 402 is supported by a tapered roller bearing 668 placed between the side wall portion 402 and the fifth housing member 65. The first clutch drum 40A is one aspect of a first engageable member of the present disclosure.

Similarly, the second multiple disc clutch 44 includes a plurality of second input clutch plates 441 configured to rotate together with the input rotational member 40, and a plurality of second output clutch plates 442 configured to rotate together with the second output rotational member 42. The second output clutch plate 442 includes a plurality of projections 442a provided in an end portion, on the inside-diameter side, of the second output clutch plate 442. The projections 442a are engaged with a spline portion 422a formed on an outer peripheral surface of the large-diameter cylindrical portion 422 of the second output rotational member 42 in an axially movable manner and in a relatively non-rotatable manner.

The second clutch drum 40B integrally includes a cylindrical portion 403 formed in a cylindrical shape, and a side wall portion 404 extending radially inwardly from a first axial end portion of the cylindrical portion 403. A spline engageable portion 403a is formed on an inner peripheral surface of the cylindrical portion 403. The second input clutch plates 441 are engaged with the spline engageable portion 403a in an axially movable manner and in a relatively non-rotatable manner. A plurality of projections 441a engaged with the spline engageable portion 403a is provided in an end portion, on the outside-diameter side, of the second input clutch plate 441. The side wall portion 404 is supported by a tapered roller bearing 669 placed between the side wall portion 404 and the fourth housing member 64. The second clutch drum 40B is one aspect of a second engageable member of the present disclosure.

The first pressing mechanism 45 includes an annular piston 451 configured to receive a hydraulic pressure supplied from the hydraulic unit 16, a thrust roller bearing 452 adjacent to the piston 451, a pressing member 453 configured to receive a pressing force of the piston 451 via the thrust roller bearing 452, a pressing plate 454 placed inside the first clutch drum 40A, and a return spring 455.

The piston 451 is accommodated in a cylinder 650 formed in the fifth housing member 65 and moves to the first multiple disc clutch 43 side by the pressure of a hydraulic fluid supplied from the hydraulic unit 16 to the cylinder 650. The pressing member 453 integrally includes an annular portion 453a formed in a toric shape and a plurality of columnar pressing projections 453b projecting from the annular portion 453a toward the first multiple disc clutch 43 side. The pressing projections 453b are passed through through-holes 402a formed in the side wall portion 402 of the first clutch drum 40A such that distal end portions of the pressing projections 453b abut the pressing plate 454. The annular portion 453a has a diameter larger than that of the first clutch drum 40A, and the return spring 455 abuts an end portion, on the outside-diameter side, of the annular portion 453a. The return spring 455 is placed outside the first clutch drum 40A and biases the pressing member 453 toward the fifth housing member 65 side.

Similarly, the second pressing mechanism 46 includes an annular piston 461 configured to receive a hydraulic pressure supplied from the hydraulic unit 16, a thrust roller bearing 462 adjacent to the piston 461, a pressing member 463 configured to receive a pressing force of the piston 461 via the thrust roller bearing 462, a pressing plate 464 placed inside the second clutch drum 40B, and a return spring 465.

The piston 461 is accommodated in a cylinder 640 formed in the fourth housing member 64 and moves to the second multiple disc clutch 44 side by the pressure of a hydraulic fluid supplied from the hydraulic unit 16 to the cylinder 640. The pressing member 463 integrally includes an annular portion 463a formed in a toric shape and a plurality of columnar pressing projections 463b projecting from the annular portion 463a toward the second multiple disc clutch 44 side. The pressing projections 463b are passed through through-holes 404a formed in the side wall portion 404 of the second clutch drum 40B and abut the pressing plate 464. The return spring 465 abuts an end portion, on the outside-diameter side, of the annular portion 463a such that the pressing member 463 is biased toward the fourth housing member 64 side.

The first pressing mechanism 45 presses the first multiple disc clutch 43 toward the center plate 47 by the pressure of a hydraulic fluid supplied to the cylinder 650 of the fifth housing member 65, so that the first input clutch plates 431 make frictional contact with the first output clutch plates 432. Hereby, a driving force corresponding to a pressing force of the first pressing mechanism 45 is transmitted to the left drive shaft 151 from the input rotational member 40 via the first output rotational member 41 and the first output shaft 51.

The second pressing mechanism 46 presses the second multiple disc clutch 44 toward the center plate 47 by the pressure of a hydraulic fluid supplied to the cylinder 640 of the fourth housing member 64, so that the second input clutch plates 441 make frictional contact with the second output clutch plates 442. Hereby, a driving force corresponding to a pressing force of the second pressing mechanism 46 is transmitted to the right drive shaft 152 from the input rotational member 40 via the second output rotational member 42 and the second output shaft 52.

The hydraulic unit 16 can independently adjust respective pressures of the hydraulic fluids supplied to the cylinders 640, 650. The hydraulic unit 16 includes a pump configured to generate a pressure in a hydraulic fluid, for example, and two electromagnetic valves configured to independently adjust respective pressures of the hydraulic fluids supplied to the cylinders 640, 650. For example, at the time when the four-wheel drive vehicle 1 travels straight, the control device 17 controls the hydraulic unit 16 so that hydraulic fluids at the same pressure are supplied to the cylinders 650, 640. Further, at the time when the four-wheel drive vehicle 1 turns, the control device 17 controls the hydraulic unit 16 so that a driving force larger than a driving force applied to a wheel on a radially inner side of the turning is distributed to a wheel on a radially outer side of the turning out of the right and left rear wheels 103, 104.

Figure 4A:
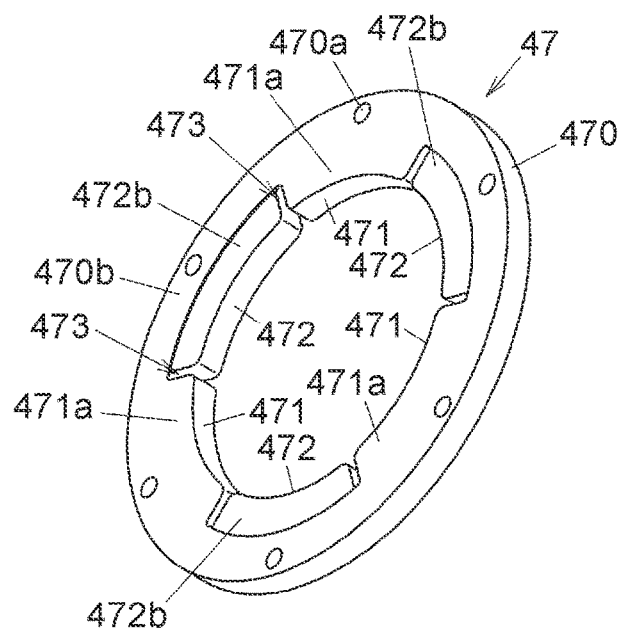
FIG. 4A is a perspective view illustrating a side face, on a first multiple disc clutch side, of a center plate.
Figure 4B:
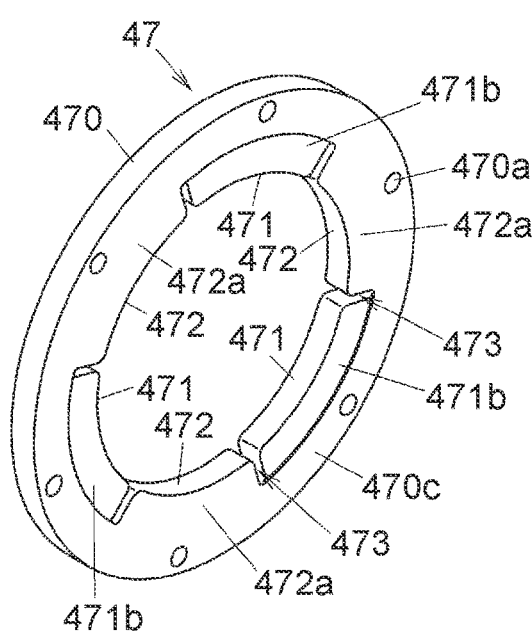
FIG. 4B is a perspective view illustrating a side face, on a second multiple disc clutch side, of the center plate.
Figure 4C:
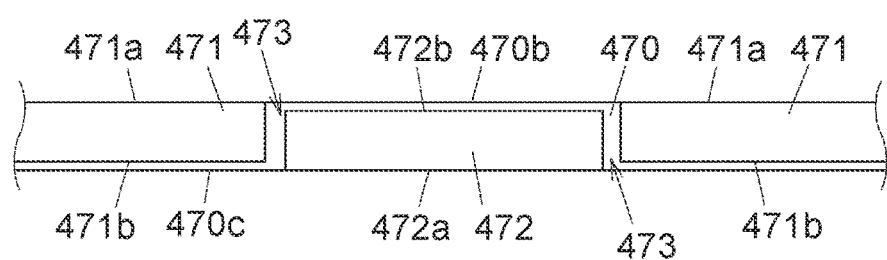
FIG. 4C is an explanatory view illustrating a state where the center plate is viewed from a central part side.

FIG. 4A is a perspective view illustrating a side face, on the first multiple disc clutch 43 side, of the center plate 47. FIG. 4B is a perspective view illustrating a side face, on the second multiple disc clutch 44 side, of the center plate 47. FIG. 4C is an explanatory view illustrating a state where the center plate 47 is viewed from a central part side (the first and second output rotational members 41, 42 side).

The center plate 47 is formed by performing press-molding on a steel sheet such as a cold rolled steel sheet (SPCC), for example. The center plate 47 integrally includes an annular base portion 470 fixed to the input rotational member 40, and a plurality of first projecting pieces 471 and a plurality of second projecting pieces 472 projecting radially inwardly from the base portion 470. The first projecting pieces 471 receive a pressing force of the first pressing mechanism 45 via the first multiple disc clutch 43, and the second projecting pieces 472 receive a pressing force of the second pressing mechanism 46 via the second multiple disc clutch 44.

In the present embodiment, the center plate 47 is constituted by three first projecting pieces 471 and three second projecting pieces 472, and the first projecting pieces 471 and the second projecting pieces 472 are provided alternately along the circumferential direction of the base portion 470. The three first projecting pieces 471 and the three second projecting pieces 472 have circumferential lengths equal to each other and also have the same radial length. Further, the three first projecting pieces 471 and the three second projecting pieces 472 are divided from each other in the circumferential direction of the base portion 470 by dividing grooves 473 as a plurality of slits extending in the radial direction of the base portion 470.

The first projecting piece 471 has a first pressure receiving surface 471a configured to receive the pressing force of the first pressing mechanism 45 via the first multiple disc clutch 43, and the second projecting piece 472 has a second pressure receiving surface 472a configured to receive the pressing force of the second pressing mechanism 46 via the second multiple disc clutch 44. The first pressure receiving surface 471a faces the first input clutch plate 431 placed closest to the center plate 47 side among the first input clutch plates 431. The second pressure receiving surface 472a faces the second input clutch plate 441 placed closest to the center plate 47 side among the second input clutch plates 441. The first pressure receiving surface 471a and the second pressure receiving surface 472a are flat planes vertical to a direction parallel to the rotation axis O.

The first projecting piece 471 is configured such that a first back face 471b as a back face of the first pressure receiving surface 471a is placed closer to the first multiple disc clutch 43 side than the second pressure receiving surface 472a, and the first back face 471b does not make contact with the second input clutch plate 441. Further, the second projecting piece 472 is configured such that a second back face 472b as a back face of the second pressure receiving surface 472a is placed closer to the second multiple disc clutch 44 side than the first pressure receiving surface 471a, and the second back face 472b does not make contact with the first input clutch plate 431. This restrains the pressing force of the first pressing mechanism 45 from acting on the second projecting pieces 472 and the pressing force of the second pressing mechanism 46 from acting on the first projecting pieces 471.

Further, the first projecting piece 471 is divided from the second projecting piece 472 by the dividing groove 473. Hereby, even if the first projecting piece 471 slightly elastically deforms so as to fall down toward the second multiple disc clutch 44 side due to the pressing force of the first pressing mechanism 45, the second projecting piece 472 is restrained from falling down toward the second multiple disc clutch 44 side together with the first projecting piece 471. Also, even if the second projecting piece 472 slightly elastically deforms so as to fall down toward the first multiple disc clutch 43 side due to the pressing force of the second pressing mechanism 46, the first projecting piece 471 is restrained from falling down toward the first multiple disc clutch 43 side together with the second projecting piece 472. Hereby, even in a case where the pressing force of the first pressing mechanism 45 or the pressing force of the second pressing mechanism 46 increases, these pressing forces are restrained from interfering with each other.

The center plate 47 is fixed to the input rotational member 40 such that the base portion 470 is sandwiched between the cylindrical portion 401 of the first clutch drum 40A and the cylindrical portion 403 of the second clutch drum 40B. The base portion 470 has a plurality of bolt insertion holes 470a through which the bolts 400 are passed, and the base portion 470 is sandwiched between the first clutch drum 40A and the second clutch drum 40B by axial tensions of the bolts 400.

Respective thicknesses of the first projecting piece 471 and the second projecting piece 472 in the axial direction of the input rotational member 40 are thinner than the thickness of the base portion 470. The axial position of the first pressure receiving surface 471a is the same as the axial position of a first end surface 470b, on the first clutch drum 40A side, of the base portion 470, and the axial position of the second pressure receiving surface 472a is the same as the axial position of a second end surface 470c, on the second clutch drum 40B side, of the base portion 470. In other words, the first pressure receiving surface 471a and the first end surface 470b of the base portion 470 form one continuous plane without any step, and the second pressure receiving surface 472a and the second end surface 470c of the base portion 470 form one continuous plane without any step.

The dividing grooves 473 are formed in a range closer to the cylindrical portions 401, 403 side of the input rotational member 40 than the first output clutch plates 432 and the second output clutch plates 442. Hereby, the center plate 47 is configured such that the pressing force of the first pressing mechanism 45 hardly acts on the second projecting pieces 472 and the pressing force of the second pressing mechanism 46 hardly acts on the first projecting pieces 471.

Operation and Effect of First Embodiment

In the first embodiment described above, the first back faces 471b of the first projecting pieces 471 are placed closer to the first multiple disc clutch 43 side than the second pressure receiving surfaces 472a, and the second back faces 472b of the second projecting pieces 472 are placed closer to the second multiple disc clutch 44 side than the first pressure receiving surface 471a. Accordingly, the pressing force of the first pressing mechanism 45 is received by the first projecting pieces 471 and hardly acts on the second multiple disc clutch 44, and the pressing force of the second pressing mechanism 46 is received by the second projecting pieces 472 and hardly acts on the first multiple disc clutch 43. This accordingly makes it possible to control respective driving forces to be distributed to the right and left rear wheels 103, 104 with high accuracy.

Further, in the first embodiment, it is not necessary to form a gap between the right and left disc portions, unlike the configuration described in WO 2011/089825, for example. This makes it possible to shorten the axial length of the driving force distribution device 4, thereby making it possible to reduce a device size.

Modification of First Embodiment

Next will be described a modification of the first embodiment with reference to FIGS. 5A to 5C. The modification is obtained by modifying the configuration of the center plate 47 of the first embodiment.

Figure 5A:
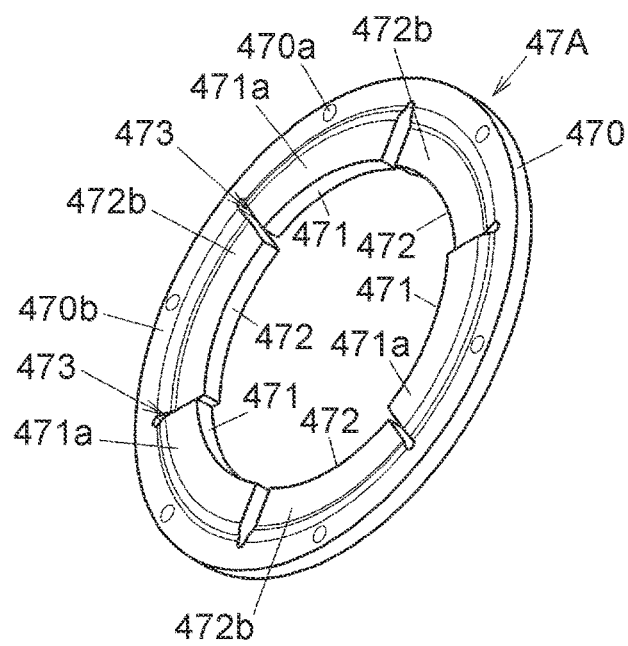
FIG. 5A is a perspective view illustrating a side face, on a first multiple disc clutch side, of a center plate according to a modification.
Figure 5B:
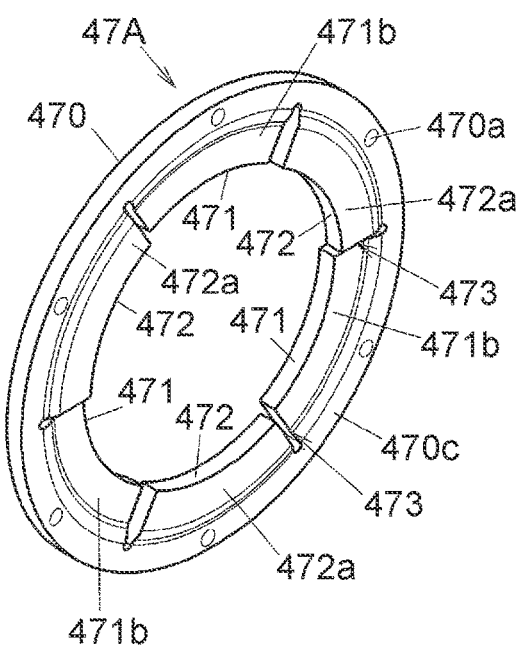
FIG. 5B is a perspective view illustrating a side face, on a second multiple disc clutch side, of the center plate according to the modification.
Figure 5C:
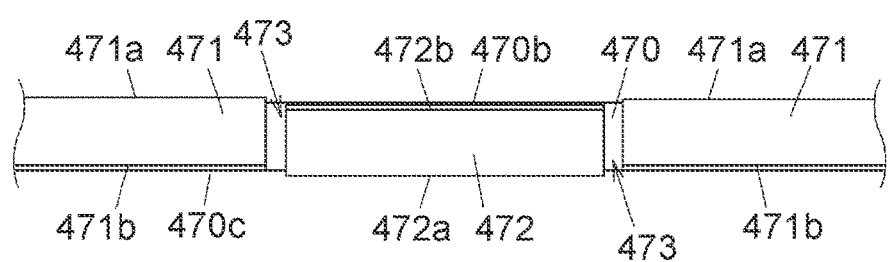
FIG. 5C is an explanatory view illustrating a state where the center plate according to the modification is viewed from a central part side.

FIG. 5A is a perspective view illustrating a side face, on the first multiple disc clutch 43 side, of a center plate 47A according to the modification. FIG. 5B is a perspective view illustrating a side face, on the second multiple disc clutch 44 side, of the center plate 47A. FIG. 5C is an explanatory view illustrating a state where the center plate 47A is viewed from a central part side.

Similarly to the center plate 47 according to the first embodiment, the center plate 47A integrally includes the annular base portion 470 fixed to the input rotational member 40, and the first projecting pieces 471 and the second projecting pieces 472 projecting radially from the base portion 470. The first projecting pieces 471 are divided from the second projecting pieces 472 in the circumferential direction of the base portion 470 by the dividing grooves 473, but the first projecting pieces 471 project to a first side (the first multiple disc clutch 43 side) in the axial direction from the base portion 470, and the second projecting pieces 472 project to a second side (the second multiple disc clutch 44 side) in the axial direction from the base portion 470. This configuration is different from the center plate 47 of the first embodiment.

The thicknesses of the first projecting piece 471 and the second projecting piece 472 are the same as the thickness of the base portion 470. The first projecting piece 471 is configured such that the first pressure receiving surface 471a is placed closer to the first clutch drum 40A side than the first end surface 470b of the base portion 470, and the first back face 471b is placed closer to the first clutch drum 40A side than the second end surface 470c of the base portion 470. The second projecting piece 472 is configured such that the second pressure receiving surface 472a is placed closer to the second clutch drum 40B side than the second end surface 470c of the base portion 470, and the second back face 472b is placed closer to the second clutch drum 40B side than the first end surface 470b of the base portion 470.

Similarly to the center plate 47 of the first embodiment, the center plate 47A is configured such that the base portion 470 is sandwiched between the first clutch drum 40A and the second clutch drum 40B by axial tensions of the bolts 400 passed through the bolt insertion holes 470a. Further, the dividing grooves 473 are formed in a range closer to the outside-diameter side than the first output clutch plates 432 and the second output clutch plates 442.

Even in a case where the center plate 47A of this modification is used, the same operation and effect as the first embodiment are obtained. Further, since the thicknesses of the first projecting piece 471 and the second projecting piece 472 can be set to the same as the thickness of the base portion 470, the center plate 47A can be easily molded. Note that either of the first projecting pieces 471 and the second projecting pieces 472 may be configured to project in the axial direction from the base portion 470. Even in this case, it is possible to obtain the same operation and effect as a case where the first projecting pieces 471 project to the first side in the axial direction from the base portion 470, and the second projecting pieces 472 project to the second side in the axial direction from the base portion 470.

Second Embodiment

Next will be described a second embodiment of the present disclosure with reference to FIGS. 6, 7A, and 7B.

FIG. 6 is a sectional view illustrating an exemplary configuration of a driving force distribution device 7 according to the second embodiment of the present disclosure. FIG. 6 illustrates a part of the driving force distribution device 7 above the rotation axis O, together with its peripheral part.

The driving force distribution device 7 includes: first and second output rotational members 71, 72 placed to rotate relative to each other around the rotation axis O on the same axis; an input rotational member 70 placed to rotate relative to the first and second output rotational members 71, 72; a first multiple disc clutch 73 placed between the input rotational member 70 and the first output rotational member 71; a second multiple disc clutch 74 placed between the input rotational member 70 and the second output rotational member 72; a first pressing mechanism 75 configured to press the first multiple disc clutch 73; a second pressing mechanism 76 configured to press the second multiple disc clutch 74; and a pressure receiving member 77 placed between the first multiple disc clutch 73 and the second multiple disc clutch 74 and configured to receive a pressing force of the first pressing mechanism 75 and a pressing force of the second pressing mechanism 76.

A rotational force of an input shaft 801 configured to rotate by a drive source such as an electric motor, for example, is input into the input rotational member 70 via an input connecting member 802 and a sideplate 803. The input connecting member 802 is fixed to the input shaft 801 by welding, and the sideplate 803 is engaged with an end portion of the input connecting member 802 in a relatively non-rotatable manner. The input shaft 801 is supported by a ball bearing 92 so that the input shaft 801 rotates relative to a housing 91.

The input rotational member 70 includes a first clutch hub 701 and a second clutch hub 702, and the first clutch hub 701 is connected to the second clutch hub 702 by a plurality of bolts 700 such that the pressure receiving member 77 is sandwiched between the first clutch hub 701 and the second clutch hub 702. A spline engageable portion 701a is formed on an outer peripheral surface of the first clutch hub 701, and a spline engageable portion 702a is formed on an outer peripheral surface of the second clutch hub 702. The sideplate 803 is engaged with the spline engageable portion 702a of the second clutch hub 702. The first clutch hub 701 is one aspect of the first engageable member of the present disclosure, and the second clutch hub 702 is one aspect of the second engageable member of the present disclosure.

Figures 7A, 7B:
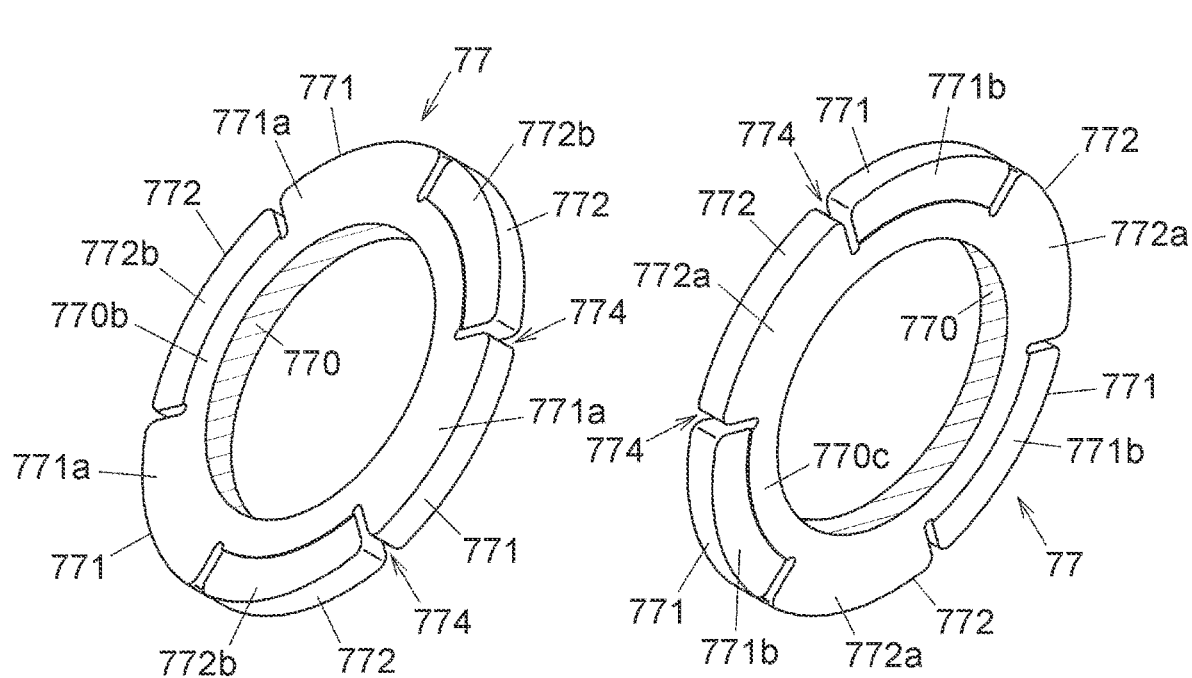
FIG. 7A is a perspective view illustrating a part of a pressure receiving member according to the second embodiment and illustrates a side face, on a first multiple disc clutch side, of the pressure receiving member.
FIG. 7B is a perspective view illustrating a part of the pressure receiving member according to the second embodiment and illustrates a side face, on a second multiple disc clutch side, of the pressure receiving member.

FIGS. 7A, 7B are perspective views each illustrating a part of the pressure receiving member 77. FIG. 7A illustrates a side face, on the first multiple disc clutch 73 side, of the pressure receiving member 77, and FIG. 7B illustrates a side face, on the second multiple disc clutch 74 side, of the pressure receiving member 77.

The pressure receiving member 77 integrally includes: an annular base portion 770 fixed between the first clutch hub 701 and the second clutch hub 702; a plurality of first projecting pieces 771 and a plurality of second projecting pieces 772 projecting radially outwardly from the base portion 770; and a cylindrical portion 773 (see FIG. 6) having a cylindrical shape and extending toward the opposite sides in the axial direction from an end portion, on the inside-diameter side, of the base portion 770. The base portion 770 has a plurality of bolt insertion holes 770a through which the bolts 700 are passed. FIGS. 7A, 7B illustrate a part of the pressure receiving member 77, the part being closer to the outside-diameter side than a part where the bolt insertion holes 770a are formed.

The first output rotational member 71 integrally includes a cylindrical portion 711 placed on an outer periphery of the first clutch hub 701, and an annular side wall portion 712 extending inwardly from a first axial end portion of the cylindrical portion 711. A spline engageable portion 711a is formed on an inner peripheral surface of the cylindrical portion 711. An end portion, on the inside-diameter side, of the side wall portion 712 is fixed to a first output shaft 81 by welding.

The second output rotational member 72 integrally includes a cylindrical portion 721 placed on an outer periphery of the second clutch hub 702, and an annular side wall portion 722 extending inwardly from a first axial end portion of the cylindrical portion 721. A spline engageable portion 721a is formed on an inner peripheral surface of the cylindrical portion 721. An end portion, on the inside-diameter side, of the side wall portion 722 is fixed to a second output shaft 82 by welding. The cylindrical portion 721 of the second output rotational member 72 is placed between the cylindrical portion 711 of the first output rotational member 71 and the input connecting member 802.

A support shaft 83 having a cylindrical shape is passed through the cylindrical portion 773 of the pressure receiving member 77. The support shaft 83 supports the pressure receiving member 77 so that the pressure receiving member 77 rotates. Two oil passages are formed in the support shaft 83, and one oil passage 83a out of the two oil passages is illustrated in FIG. 6. In the cylindrical portion 773 of the pressure receiving member 77, first and second oil holes 773a, 773b communicating with the two oil passages of the support shaft 83, respectively, are formed so as to penetrate the cylindrical portion 773 in the radial direction.

A plurality of thrust roller bearings 931 to 935 and a plurality of radial roller bearings 941 to 944 are each placed between corresponding members from among the housing 91, the input shaft 801, the first output shaft 81, the second output shaft 82, the cylindrical portion 773 of the pressure receiving member 77, and the support shaft 83.

The first multiple disc clutch 73 includes a plurality of first input clutch plates 731 configured to rotate together with the input rotational member 70, and a plurality of first output clutch plates 732 configured to rotate together with the first output rotational member 71. The first input clutch plates 731 each include a plurality of projections 731a provided in an end portion on the inside-diameter side. The projections 731a are engaged with the spline engageable portion 701a of the first clutch hub 701 in an axially movable manner and in a relatively non-rotatable manner. The first output clutch plates 732 each include a plurality of projections 732a provided in an end portion on the outside-diameter side. The projections 732a are engaged with the spline engageable portion 711a of the first output rotational member 71 in an axially movable manner and in a relatively non-rotatable manner.

The second multiple disc clutch 74 includes a plurality of second input clutch plates 741 configured to rotate together with the input rotational member 70, and a plurality of second output clutch plates 742 configured to rotate together with the second output rotational member 72. The second input clutch plates 741 each include a plurality of projections 741a provided in an end portion on the inside-diameter side, and the projections 741a are engaged with the spline engageable portion 702a of the second clutch hub 702 in an axially movable manner and in a relatively non-rotatable manner. The second output clutch plates 742 each include a plurality of projections 742a provided in an end portion on the outside-diameter side. The projections 742a are engaged with the spline engageable portion 721a of the second output rotational member 72 in an axially movable manner and in a relatively non-rotatable manner.

The first pressing mechanism 75 includes a piston 751, a pressing member 752 configured to receive a pressing force of the piston 751 and press the first multiple disc clutch 73 toward the pressure receiving member 77, and a return spring 753. The piston 751 axially moves by the pressure of a hydraulic fluid supplied from the first oil hole 773a of the pressure receiving member 77. The pressing member 752 is engaged with the spline engageable portion 701a of the first clutch hub 701 in an axially movable manner and in a relatively non-rotatable manner. The return spring 753 is placed between the base portion 770 of the pressure receiving member 77 and the piston 751.

The second pressing mechanism 76 includes a piston 761, a pressing member 762 configured to receive a pressing force of the piston 761 and press the second multiple disc clutch 74 toward the pressure receiving member 77, and a return spring 763. The piston 761 axially moves by the pressure of a hydraulic fluid supplied from the second oil hole 773b of the pressure receiving member 77. The pressing member 762 is engaged with the spline engageable portion 702a of the second clutch hub 702 in an axially movable manner and in a relatively non-rotatable manner. The piston 761 includes a plurality of projections 761a passed through a plurality of through-holes 803a formed in the sideplate 803, respectively, and distal ends of the projections 761a abut the pressing member 762. The return spring 763 is placed between the base portion 770 of the pressure receiving member 77 and the piston 761.

On an outer periphery of a part of the cylindrical portion 773 of the pressure receiving member 77, the part being placed inside the first clutch hub 701, a partition wall 951 by which a hydraulic chamber 750 communicating with the first oil hole 773a is formed, and an abutment member 952 configured to abut an end portion, on the inside-diameter side, of the partition wall 951 are placed. The movement of the abutment member 952 is restricted by a snap ring 953 fitted to the cylindrical portion 773. Further, on an outer periphery of a part of the cylindrical portion 773 of the pressure receiving member 77, the part being placed inside the second clutch hub 702, a partition wall 954 by which a hydraulic chamber 760 communicating with the second oil hole 773b is formed, and an abutment member 955 configured to abut an end portion, on the inside-diameter side, of the partition wall 954 are placed. The movement of the abutment member 955 is restricted by a snap ring 956 fitted to the cylindrical portion 773.

The pressure receiving member 77 includes three first projecting pieces 771 configured to receive the pressing force of the first pressing mechanism 75 via the first multiple disc clutch 73, and three second projecting pieces 772 configured to receive the pressing force of the second pressing mechanism 76 via the second multiple disc clutch 74. The first projecting pieces 771 and the second projecting pieces 772 project radially outwardly from the base portion 770 and are provided alternately along the circumferential direction of the base portion 770.

Further, the three first projecting pieces 771 and the three second projecting pieces 772 have circumferential lengths equal to each other and also have the same radial length. Further, the three first projecting pieces 771 and the three second projecting pieces 772 are divided from each other in the circumferential direction of the base portion 770 by dividing grooves 774 as a plurality of slits extending in the radial direction of the base portion 770. The dividing grooves 774 are formed in a range closer to the first and second clutch hubs 701, 702 side than the first output clutch plates 732 and the second output clutch plates 742.

The first projecting piece 771 has a first pressure receiving surface 771a facing one first input clutch plate 731 out of the first input clutch plates 731, and a first back face 771b as a back face of the first pressure receiving surface 771a. The second projecting piece 772 has a second pressure receiving surface 772a facing one second input clutch plate 741 out of the second input clutch plates 741, and a second back face 772b as a back face of the second pressure receiving surface 772a.

The first projecting piece 771 is configured such that the first back face 771b is placed closer to the first multiple disc clutch 73 side than the second pressure receiving surface 772a, and the first back face 771b does not make contact with the second input clutch plate 741. Further, the second projecting piece 772 is configured such that the second back face 772b is placed closer to the second multiple disc clutch 74 side than the first pressure receiving surface 771a, and the second back face 772b does not make contact with the first input clutch plate 731. Hereby, the pressing force of the first pressing mechanism 75 does not act on the second projecting pieces 772, and the pressing force of the second pressing mechanism 76 does not act on the first projecting pieces 771.

The pressure receiving member 77 is fixed to the input rotational member 70 such that the base portion 770 is sandwiched between the first clutch hub 701 and the second clutch hub 702. The axial position of the first pressure receiving surface 771a is the same as the axial position of a first end surface 770b, on the first clutch hub 701 side, of the base portion 770, and the axial position of the second pressure receiving surface 772a is the same as the axial position of a second end surface 770c, on the second clutch hub 702 side, of the base portion 770.

With the second embodiment described above, it is also possible to obtain the same operation and effect as the first embodiment.

Additional Matters

The present disclosure has been described based on the embodiments, but the embodiments described above do not limit the disclosure according to Claims. Further, it should be noted that all combinations of features described in the embodiments may not necessarily be essential to the means for solving the problem of the disclosure.

Further, the present disclosure can be carried out with various modifications within a range that does not deviate from the gist of the present disclosure. For example, the above embodiments deal with a case where the number of the first projecting pieces 471 in the center plate 47 is three, and the number of the second projecting pieces 472 is three. However, the number of the first projecting pieces 471 and the number of the second projecting pieces 472 may be four or more. Further, the first embodiment deals with a case where the center plate 47 is fixed to the input rotational member 40 by the bolts 400. However, the present disclosure is not limited to this. The center plate 47 may be fixed to the input rotational member 40 by welding, for example. Further, the center plate 47 may be formed integrally with the first clutch drum 40A or the second clutch drum 40B.

Further, the first embodiment, the modification of the first embodiment, and the second embodiment deal with a case where the whole first back faces 471b of the first projecting pieces 471 are placed closer to the first multiple disc clutch 43 side than the second pressure receiving surfaces 472a, and the whole second back faces 472b of the second projecting pieces 472 are placed closer to the second multiple disc clutch 44 side than the first pressure receiving surfaces 471a. However, in a range where the pressing force of the first pressing mechanism 45 can be restrained from acting on the second multiple disc clutch 44, the first back faces 471b may be at least partially placed closer to the first multiple disc clutch 43 side than the second pressure receiving surfaces 472a, and in a range where the pressing force of the second pressing mechanism 46 can be restrained from acting on the first multiple disc clutch 43, the second back faces 472b may be at least partially placed closer to the second multiple disc clutch 44 side than the first pressure receiving surfaces 471a.

Further, the first and second embodiments deal with a case where the whole axial thicknesses of the first projecting pieces 471 and the second projecting pieces 472 are thinner than the axial thickness of the base portion 470 of the input rotational member 40. However, in a range where interference between the pressing forces is restrained, the axial thicknesses of the first projecting pieces 471 and the second projecting pieces 472 may be thinner than the axial thickness of the base portion 470 at least partially in the radial direction.

What is claimed is:

1. A driving force distribution device comprising:
a first output rotational member and a second output rotational member placed to rotate relative to each other on the same axis;
an input rotational member placed to rotate relative to the first output rotational member and the second output rotational member on the same axis;
a first multiple disc clutch placed between the input rotational member and the first output rotational member and including a plurality of clutch plates;
a second multiple disc clutch placed between the input rotational member and the second output rotational member and including a plurality of clutch plates;
a pressure receiving member placed between the first multiple disc clutch and the second multiple disc clutch;
a first pressing mechanism configured to press the first multiple disc clutch toward the pressure receiving member; and
a second pressing mechanism configured to press the second multiple disc clutch toward the pressure receiving member, wherein:
the pressure receiving member includes an annular base portion fixed to the input rotational member, and a plurality of projecting pieces projecting radially inward from the base portion;
the projecting pieces include a plurality of first projecting pieces and a plurality of second projecting pieces;
the first projecting pieces each have a first pressure receiving surface configured to receive a pressing force of the first pressing mechanism via the first multiple disc clutch;
the second projecting pieces each have a second pressure receiving surface configured to receive a pressing force of the second pressing mechanism via the second multiple disc clutch;
a first back face as a back face of the first pressure receiving surface is at least partially placed closer to the first multiple disc clutch side than the second pressure receiving surface; and
a second back face as a back face of the second pressure receiving surface is at least partially placed closer to the second multiple disc clutch side than the first pressure receiving surface.

2. The driving force distribution device according to claim 1,
wherein the first projecting pieces and the second projecting pieces are divided from each other in a circumferential direction of the base portion by a plurality of slits extending in a radial direction of the base portion.

3. The driving force distribution device according to claim 2, wherein:
the first multiple disc clutch includes a plurality of first output clutch plates configured to rotate together with the first output rotational member, and a plurality of first input clutch plates configured to rotate together with the input rotational member;
the second multiple disc clutch includes a plurality of second output clutch plates configured to rotate together with the second output rotational member, and a plurality of second input clutch plates configured to rotate together with the input rotational member; and the slits extend in the radial direction so that ends of the slits are closer to the input rotational member side than the first output clutch plates and the second output clutch plates.

4. The driving force distribution device according to claim 3, wherein:
the input rotational member includes
a first engageable member provided with a spline engageable portion with which the first input clutch plates are engaged, and
a second engageable member provided with a spline engageable portion with which the second input clutch plates are engaged; and
the base portion of the pressure receiving member is sandwiched between the first engageable member and the second engageable member.

5. The driving force distribution device according to claim 1, wherein:
the pressure receiving member includes the first projecting pieces and the second projecting pieces along a circumferential direction of the base portion;
the number of the first projecting pieces is three or more;
the number of the second projecting pieces is three or more; and
the first projecting pieces and the second projecting pieces are provided alternately.

6. The driving force distribution device according to claim 1, wherein:
respective thicknesses, as measured in an axial direction of the input rotational member, of at least part of the first projecting pieces and the second projecting pieces in a radial direction are thinner than a thickness of the base portion;
an axial position of the first pressure receiving surface is the same as an axial position of a first end surface of the base portion; and
an axial position of the second pressure receiving surface is the same as an axial position of a second end surface of the base portion.

7. The driving force distribution device according to claim 1, wherein the first projecting pieces project in an axial direction of the input rotational member from the base portion, the second projecting pieces project in the axial direction of the input rotational member from the base portion, or the first projecting pieces and the second projecting pieces project in the axial direction of the input rotational member from the base portion.

* * * * *